US008039769B2

(12) United States Patent
Asp et al.

(10) Patent No.: US 8,039,769 B2
(45) Date of Patent: Oct. 18, 2011

(54) JOYSTICK DEACTIVATION

(75) Inventors: Charles J Asp, Epworth, IA (US); Jeremy B Shuler, Holy Cross, IA (US); Kevin L Pfohl, Dickeyville, WI (US); Daniel J Wild, Dubuque, IA (US)

(73) Assignee: Deere & Company, Moline, IL (US)

( * ) Notice: Subject to any disclaimer, the term of this patent is extended or adjusted under 35 U.S.C. 154(b) by 1329 days.

(21) Appl. No.: 11/523,449

(22) Filed: Sep. 19, 2006

(65) Prior Publication Data

US 2008/0066988 A1 Mar. 20, 2008

(51) Int. Cl.
*H01H 3/16* (2006.01)
*G05G 1/04* (2006.01)
*B60D 1/28* (2006.01)

(52) U.S. Cl. ......... 200/61.62; 200/334; 74/523; 74/524; 180/272; 297/411.36

(58) Field of Classification Search ............... 200/43.01, 200/50.01, 6 A, 52 R, 61.54, 61.58 R, 61.62, 200/61.85, 61.88, 329, 330, 334, 47, 573, 200/574; 307/9.1, 10.1; 297/411.36; 701/50; 180/333, 330, 272, 286, 326, 329, 331; 74/471 XY, 74/523, 524; 345/156
See application file for complete search history.

(56) References Cited

U.S. PATENT DOCUMENTS

| | | | | |
|---|---|---|---|---|
| 3,660,740 | A * | 5/1972 | Rossteutscher | 318/265 |
| 3,825,809 | A * | 7/1974 | Gatland et al. | 318/282 |
| 4,281,526 | A * | 8/1981 | Lipschutz | 70/202 |
| 5,286,078 | A * | 2/1994 | Mottino et al. | 296/153 |
| 5,552,570 | A * | 9/1996 | Shinohara et al. | 200/47 |
| 5,579,899 | A * | 12/1996 | Arnold | 200/47 |
| D377,476 | S | 1/1997 | Ljunggren et al. | |
| 5,701,793 | A | 12/1997 | Gardner et al. | |
| 5,860,488 | A | 1/1999 | Kim | |
| 6,226,582 | B1 | 5/2001 | Adsett et al. | |
| 6,246,314 | B1 * | 6/2001 | Djaid | 340/425.5 |
| 6,321,611 | B1 * | 11/2001 | Szu et al. | 74/89.37 |
| 6,402,681 | B1 * | 6/2002 | McDonough et al. | 600/22 |
| 6,538,637 | B1 * | 3/2003 | Kor | 345/156 |
| 6,914,205 | B2 * | 7/2005 | Galea | 200/43.01 |
| 6,971,279 | B2 * | 12/2005 | Jo et al. | 74/524 |
| 7,038,147 | B2 * | 5/2006 | Sasanouchi et al. | 200/5 R |
| 7,161,100 | B1 * | 1/2007 | Hsieh | 200/47 |

(Continued)

FOREIGN PATENT DOCUMENTS

JP 10 252100 9/1998

(Continued)

OTHER PUBLICATIONS

International Search Report and Written Opinion for PCT/US2007/020034, 12 pages.

*Primary Examiner* — Michael Friedhofer
(74) *Attorney, Agent, or Firm* — Baker & Daniels LLP

(57) ABSTRACT

The invention concerns an armrest mounted joystick for communication of operator initiated control signals to a vehicle controller. A plurality of switches require that the operator be safely located in the operation position in order for the control signals to reach the vehicle controller. Only when all of the switches change state, at substantially the same time, does the joystick either activate or de-activate, in response.

32 Claims, 18 Drawing Sheets

U.S. PATENT DOCUMENTS

| | | | | |
|---|---|---|---|---|
| 7,165,472 | B2 * | 1/2007 | Jo et al. | 74/524 |
| 7,175,390 | B2 * | 2/2007 | Wobben | 416/61 |
| 7,265,305 | B2 * | 9/2007 | Chiu | 200/50.32 |
| 7,290,635 | B2 * | 11/2007 | Bisick et al. | 180/272 |
| 2004/0154427 | A1 | 8/2004 | Jo et al. | |
| 2005/0009668 | A1 * | 1/2005 | Savettiere et al. | 482/66 |
| 2005/0135907 | A1 * | 6/2005 | Romano et al. | 414/401 |
| 2006/0000656 | A1 * | 1/2006 | Bisick et al. | 180/272 |
| 2006/0087097 | A1 * | 4/2006 | Kramer et al. | 280/304.1 |
| 2009/0230749 | A1 * | 9/2009 | Kostak et al. | 297/411.36 |

FOREIGN PATENT DOCUMENTS

| | | |
|---|---|---|
| JP | 2003204839 | 7/2003 |

* cited by examiner

JOYSTICK DEACTIVATION

BACKGROUND OF THE INVENTION

1. Field of the Invention

The present invention relates in general to a safety securing system for an operational lever. More particularly, the present invention relates to an operational lever including a pair of switches providing redundant safety security.

2. Description of the Related Art

Joysticks are well known and widely employed for operator input of motor vehicles. Joystick control devices are known for heavy work vehicles such as front-end loaders, as described in U.S. Pat. No. 5,701,793, and for fork-lift vehicles, as described in U.S. Pat. No. 6,226,582. Joysticks are frequently used on vehicles having significant hydraulic operational components, such as hydraulically powered drive means, steering means, and work implements e.g., buckets in the case of front-end loaders, or booms in the case of cranes and back-hoes.

The operating position for joystick controlled vehicles often provides for an operator in a sitting position. Armrests are often provided for the operator. Joysticks conveniently located in the armrest may be seen as reducing operator fatigue. Reduced fatigue may, in turn, advance worker safety for both the vehicle operator, and others working in the vicinity of the vehicle.

Vehicles often include means for adjusting the armrest position. Armrest adjustment permits different sized individual operators to place the armrest in a comfortable position. Further, an individual operator may periodically vary the position of the armrest during the course of the operator's work day. Varying the position of the armrest is particularly advantageous in the case of vehicles in use for agricultural and civil works construction, as the work days in these industries may be extended to accomplish the necessary tasks while weather cooperates.

Arm rests may rotate in a vertical plane about an axis located, for example, in the vicinity of the sitting operator's elbow, as an example of a point of adjustment. Further adjustment may be provided by rotation of the arm rest in a substantially horizontal plane.

Entry into and exit from the operator area by an operator often requires an operator to move the armrest from an operating position into an exit position. In many vehicles, the armrest is rotated in a vertical plane in order to move the armrest into a substantially vertical orientation, thereby providing the operator easy access to enter and exit the operator area. Unless the operator is in a position to control the vehicle, safety features may be employed in order to interrupt electrical signals sent from the joystick mounted upon the armrest to the vehicle controller.

Known interlock devices include switches integrated with operator seats whereby the weight of an operator in the operating position is required to initiate the starting sequence, or to send electrical signals to activate the vehicle. Armrest joystick signal interruption referred to as "Comfort Drive Control" for use in numerous wheel loaders is provided by the manufacturer Volvo and disclosed in U.S. Design Pat. No. 377,476. This armrest includes a single limit switch, and armrest adjustment is limited to rotation in the vertical plane only.

DETAILED DESCRIPTION OF AN EMBODIMENT OF THE INVENTION

Figure 19:
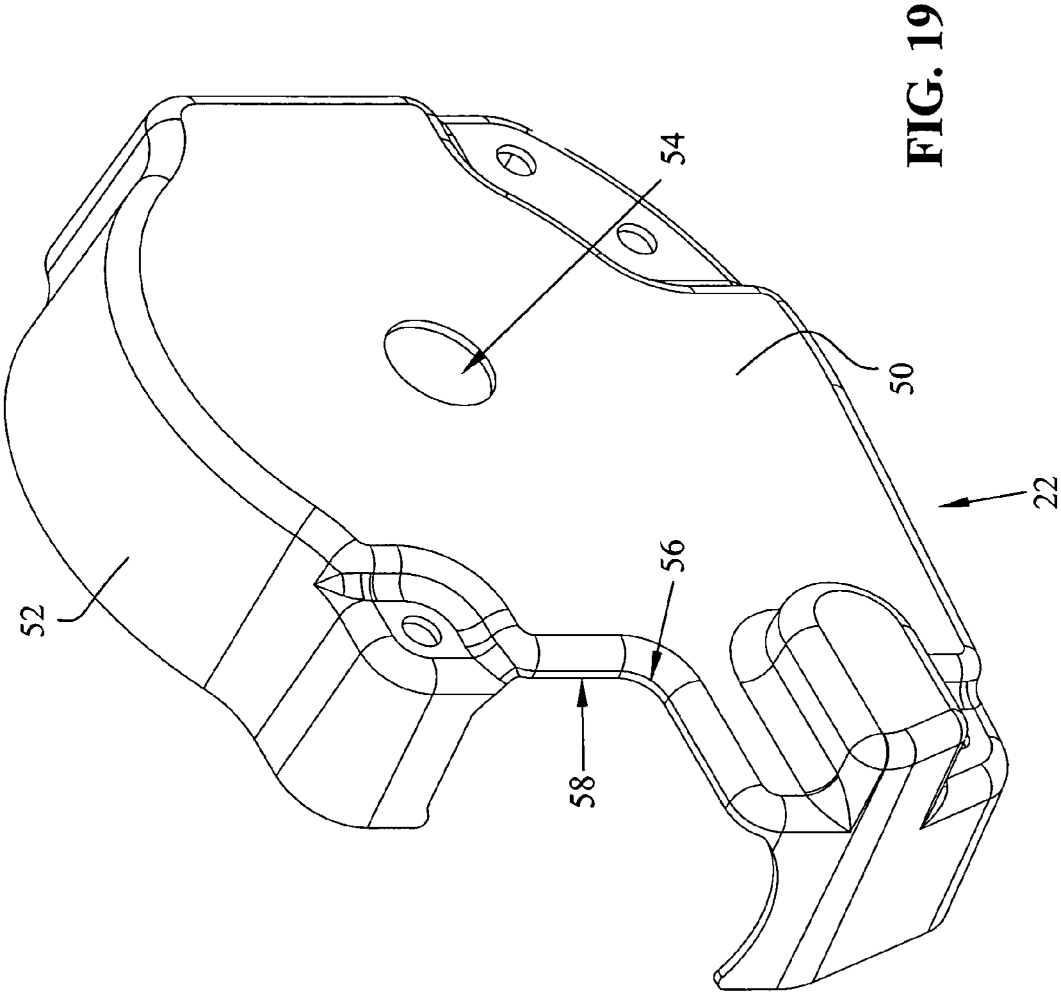
FIG. 19 depicts an enlarged view of the front cover 22. The front cover 22 is also visible in FIGS. 1-4, and 15.

FIG. 19 depicts a perspective view of front cover 22.

Figure 1:
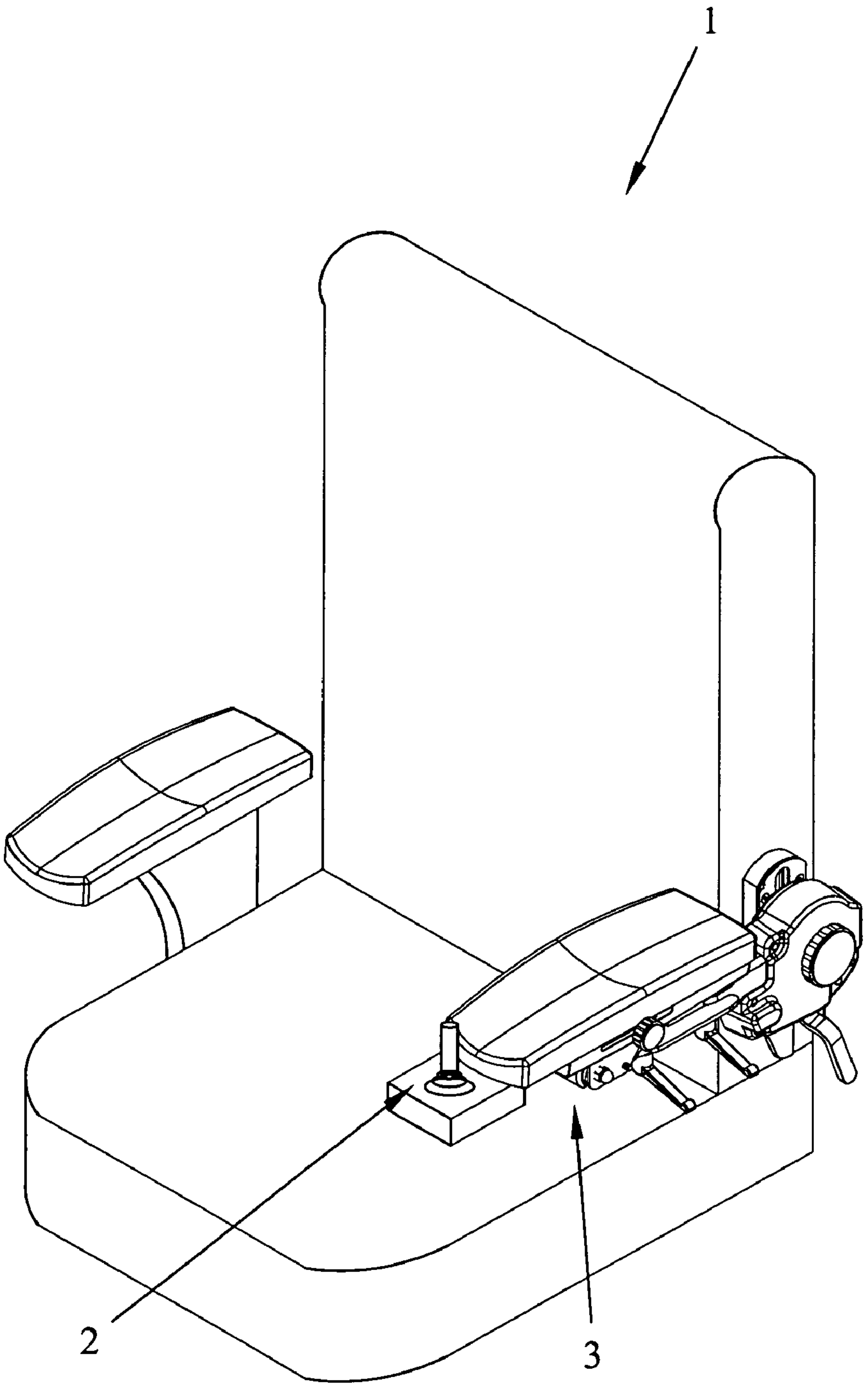
FIG. 1 depicts a perspective view of an operator's position having a joystick equipped arm rest rotatable in a substantially vertical plane and rotatable in a substantially horizontal plane.

FIG. 1 depicts a perspective view of an operator seat, generally indicated by numeral 1, including an embodiment of the present invention. Operator seat 1 includes a joystick 2 and an embodiment of an arm rest assembly 3 of the present invention. Joystick 2 may be electrically connected to a signal processor (not shown), in a known manner. The signal processor is utilized generally in a vehicle to control the movement of the vehicle based upon signals received from the joystick 2.

Figure 2:
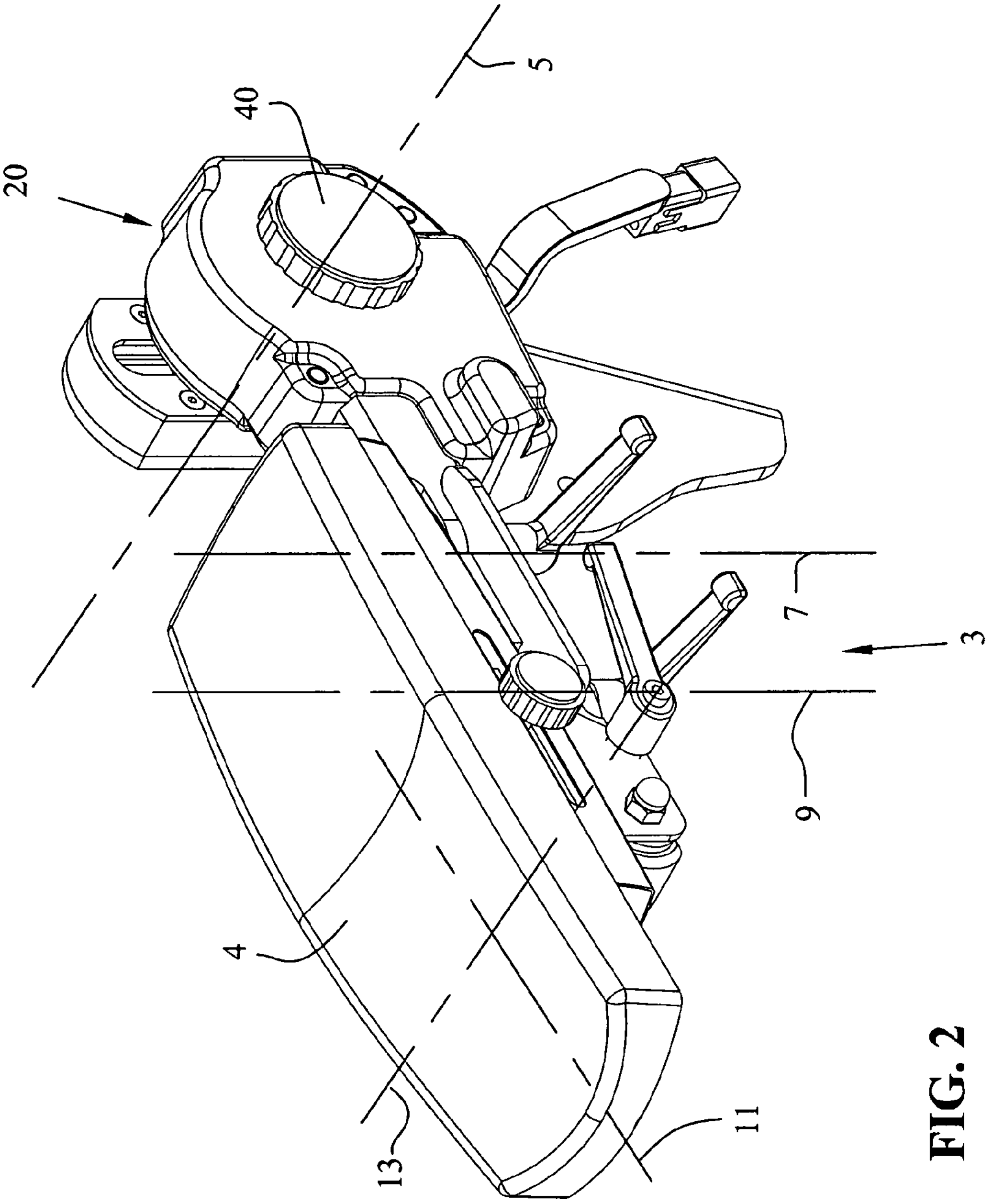
FIG. 2 depicts a perspective view of an arm rest representing an embodiment of the present invention.

FIG. 2 depicts a perspective view of arm rest assembly 3. Arm rest assembly 3 includes an arm rest 4 rotatable in a substantially vertical plane about axis 5, as would be desirable when an operator enters and exits the area of the operator seat 1 depicted in FIG. 1. In the present embodiment of the invention, axis 5 is positioned proximate the location at which the elbow of an operator rests when the operator resides in the area of the operator seat 1. Arm rest 4 may also be displaced in a plane by pivoting about vertical axes 7, 9, in a known manner. In addition, arm rest 4 may translate along an axis 11, in a known manner. Furthermore, arm rest 4 may pivot about pivot axis 13 in a known manner. Arm rest assembly 4 further includes an automatic switch assembly, generally indicated by numeral 20.

Figure 3:
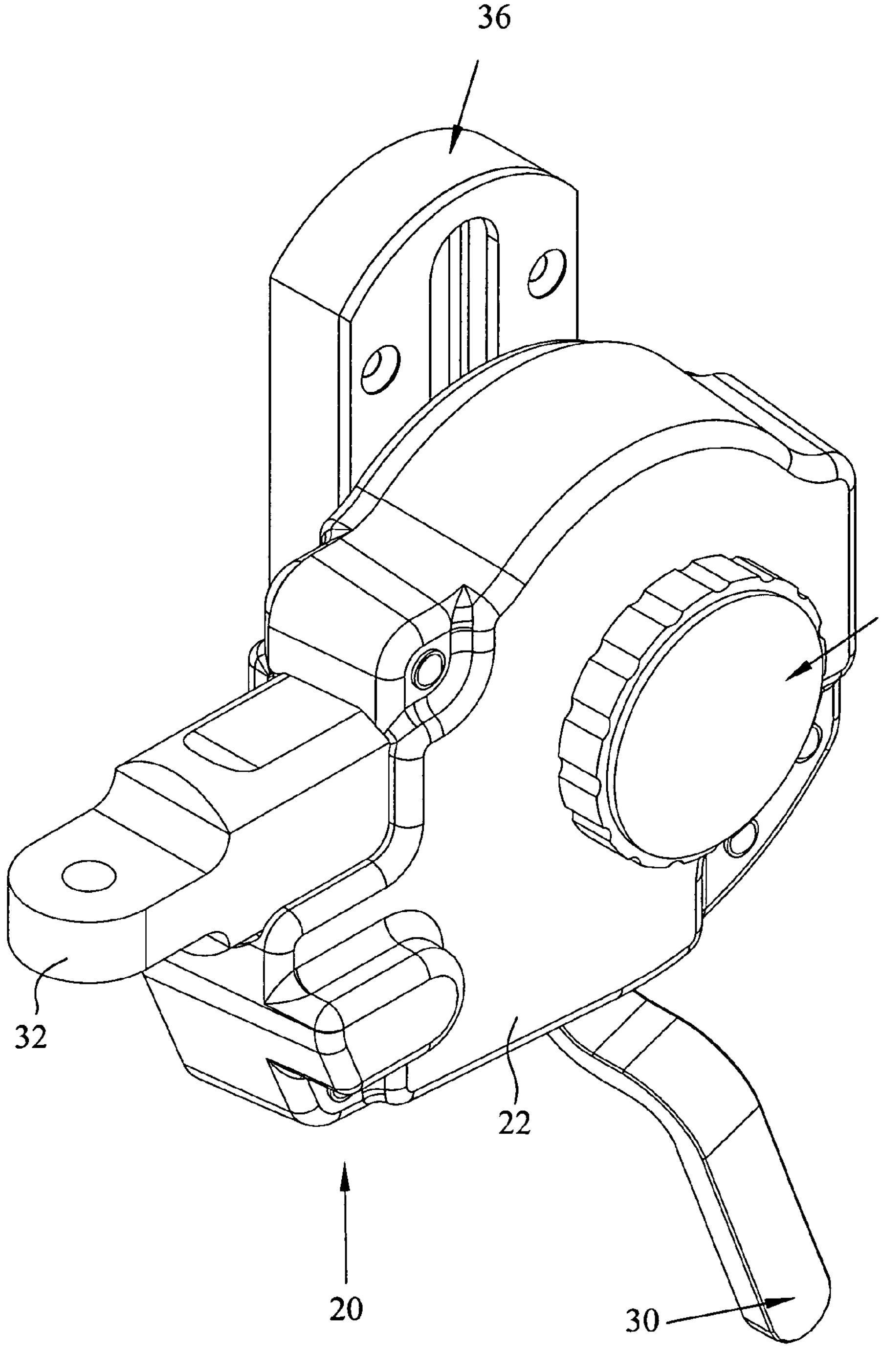
FIG. 3 depicts a perspective view of a switch assembly representing an embodiment of the present invention.
Figure 4:
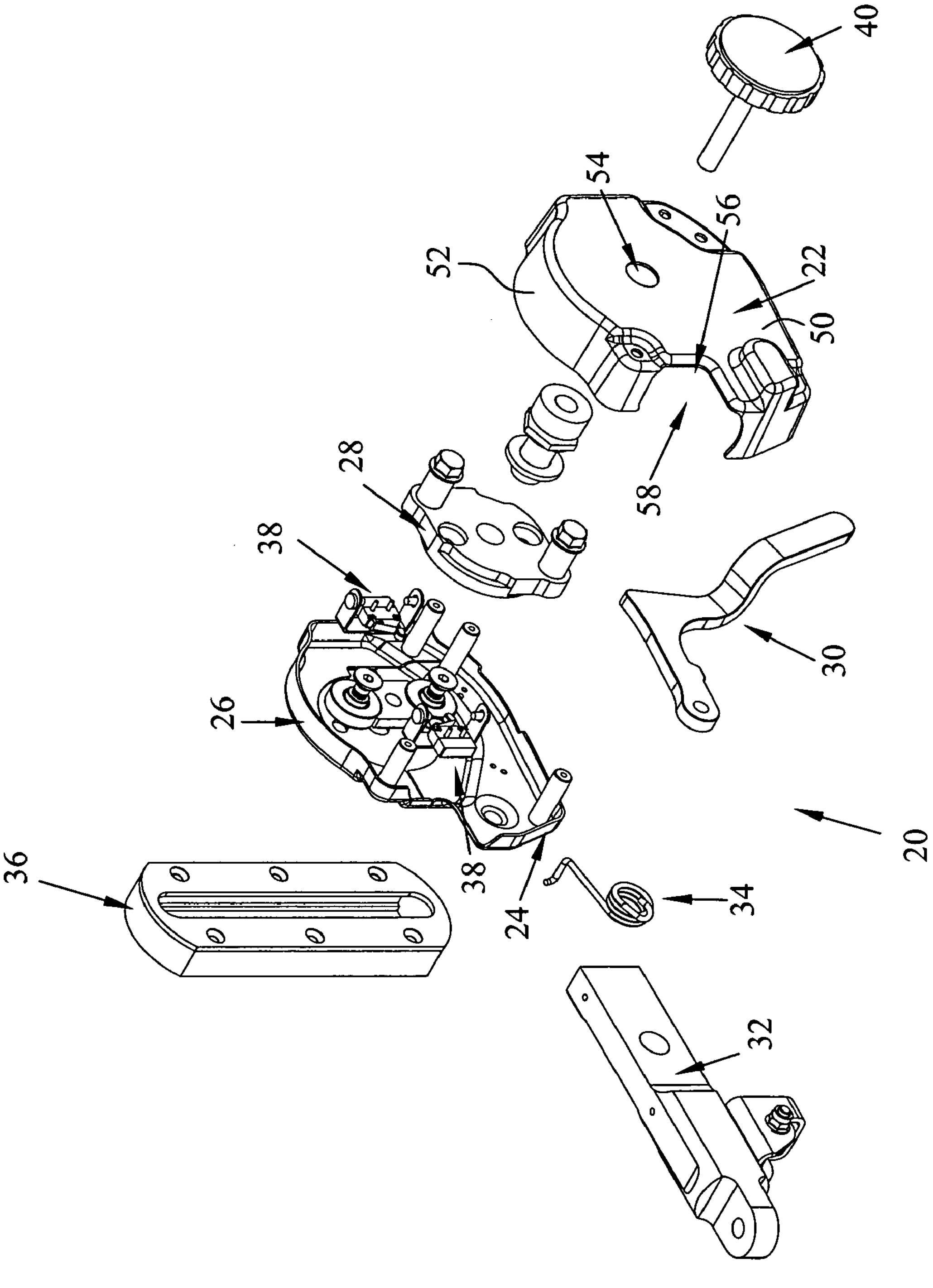
FIG. 4 depicts an exploded perspective view of the switch assembly depicted in FIG. 3.

FIG. 3 depicts a perspective view of automatic switch assembly 20, and FIG. 4 depicts an exploded perspective view of automatic switch assembly 20. In the present embodiment of the invention, automatic switch assembly 20 includes front cover 22, lower rear cover 24, upper rear cover 26, switch control assembly 28, locking handle 30, arm 32, spring 34, base 36, switches 38 and a locking mechanism 40.

Cover 22 may be manufactured from any suitable material, such as injection molded plastic. As shown in FIG. 4, in the present embodiment of the invention, cover 22 includes a base 50 and a wall 52 extending away from base 50. Base 50 includes an aperture 54 located proximate the center of base 50.

Wall 52 extends from the perimeter of base 50 in the direction of arrow 53. Wall 52 traverses almost the entirety of the perimeter of base 50, except for a portion of the perimeter thereby defining opening 56. The combination of base 50 and wall 52 defines a receiving area, generally indicated by numeral 58.

Figure 5:
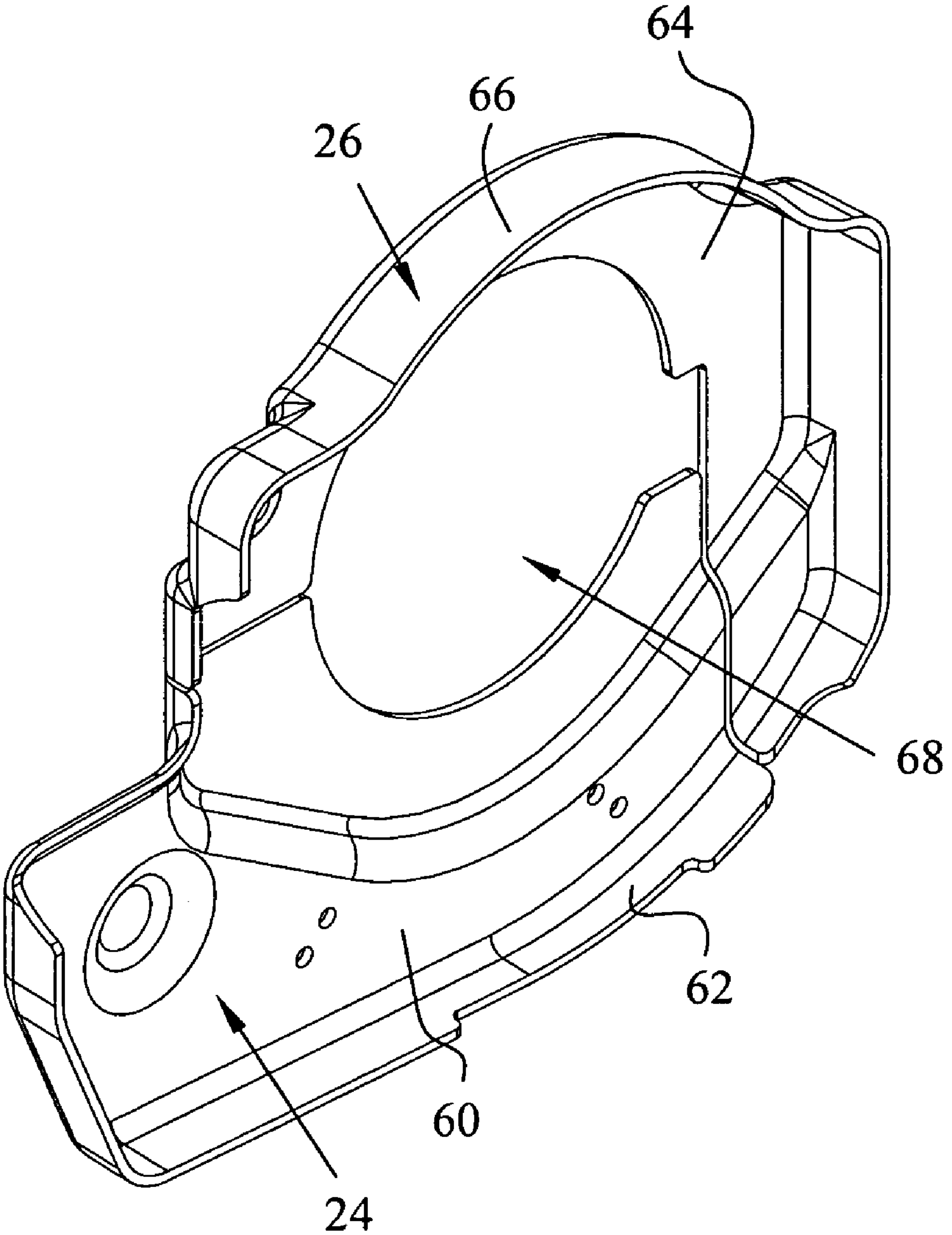
FIG. 5 depicts a perspective view of an embodiment of rear covers utilized in the switch assembly depicted in FIG. 3.

FIG. 5 depicts a perspective view of lower rear cover 24 and upper rear cover 26. The rear covers 24, 26 may be manufactured from any suitable material such as injection molded plastic. In the present embodiment of the invention, lower rear cover 24 includes a base portion 60 with a wall 62 extending therefrom in the direction indicated by arrow 65. Similarly, cover 26 includes a base portion 64 with a wall 66 extending therefrom in the direction indicated by arrow 65. Base portion 60 has a shape complementary to base portion 64. In addition, walls 62, 66 extend partially around the perimeter of the base portions 60, 64 thereby allowing the covers 24, 26 to mate, as depicted. When properly positioned and mated, the covers 24, 26 define an aperture 68.

Figure 6:
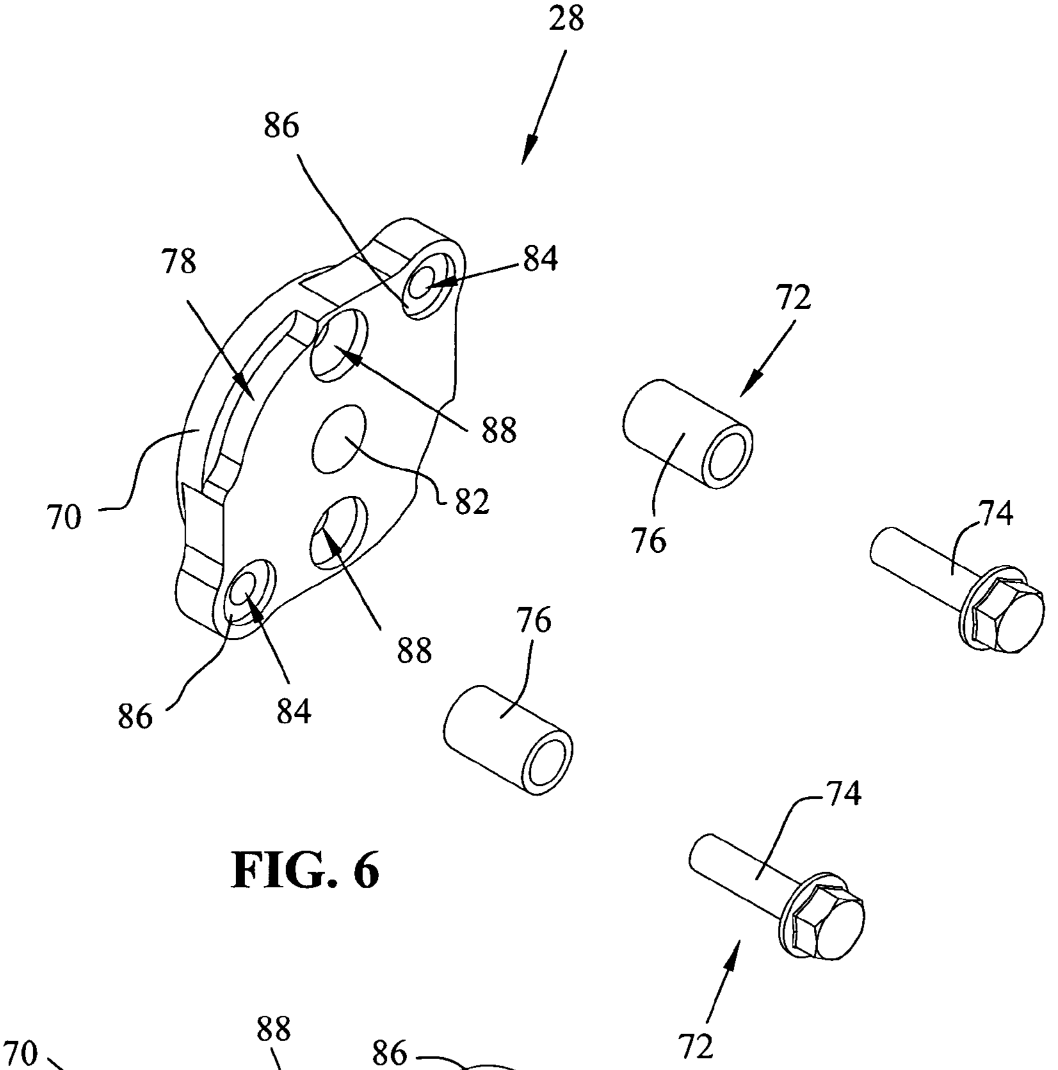
FIG. 6 depicts a perspective view of an embodiment of a switch control assembly utilized in the switch assembly depicted in FIG. 3.

FIG. 6 depicts an exploded perspective view of a switch control assembly generally indicated by numeral 28. Switch control assembly 28 includes a base plate 70 and a pair of bolt assemblies, each generally indicated by numeral 72. Each bolt assembly 72 includes a bolt 74 and a sleeve 76. Bolt 74 may be any type known in the art, and sleeve 76 is sized and configured to receive bolt 74. Sleeve 76 may be manufactured from any suitable material such as aluminum.

Figure 7:
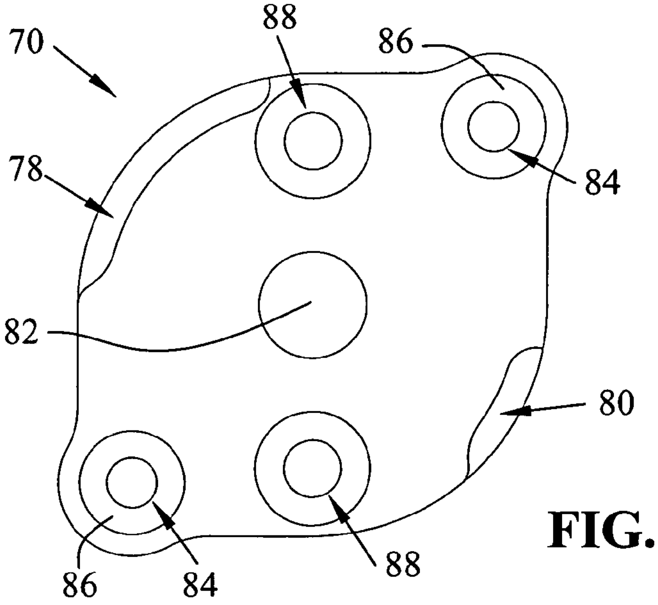
FIG. 7 depicts a top view of a plate utilized in the switch control assembly depicted in FIG. 6.

FIG. 7 depicts a top view of an embodiment of a base plate 70. With reference to both FIG. 6 and FIG. 7, base plate 70 may be manufactured from any suitable material, such as aluminum. Base plate 70 includes a first trace 78 and a second trace 80 both formed in the outer edge of base plate 70. The traces 78, 80 are positioned on opposite sides of plate 70 with respect to the center.

Base plate 70 further includes an aperture 82 located proximate the center and intermediate the traces 78, 80. In the present embodiment of the invention, aperture 82 is unthreaded and substantially smooth.

Plate 70 also includes a pair of apertures 84 each encompassed by a recessed area, generally indicated by numeral 86. In the present embodiment of the invention, apertures 84 include a thread (not shown) complementary to the thread of bolt 74. In addition, recessed area 86 is sized and configured to receive a sleeve 76.

Plate 70 further includes a pair of apertures, each generally indicated by numeral 88. In the present embodiment of the invention, the apertures 88 are unthreaded and substantially smooth.

Figure 8:
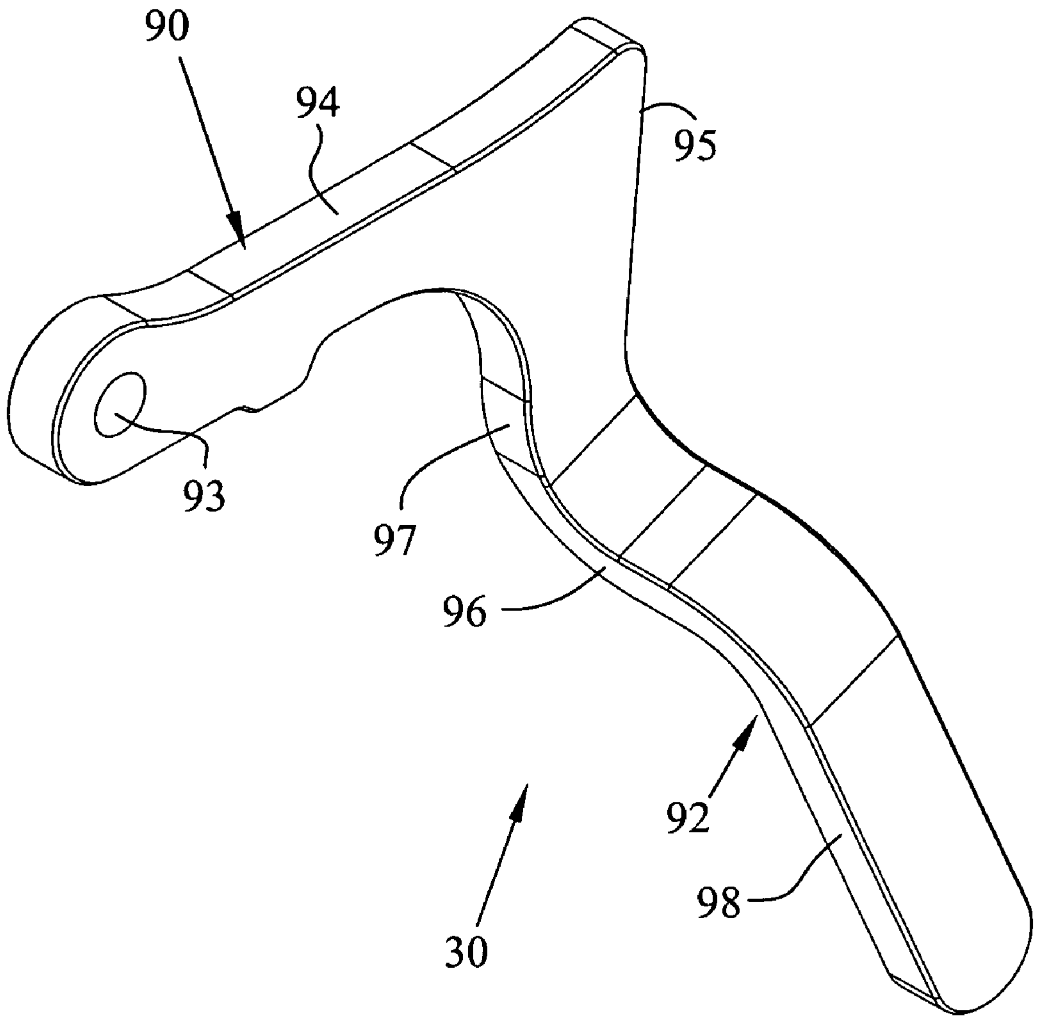
FIG. 8 depicts a perspective view of an embodiment of a handle utilized in the switch assembly depicted in FIG. 3.

FIG. 8 depicts a perspective view of a locking handle 30. Locking handle 39 may be manufactured from any suitable material, such as metal. Locking handle 30 includes first portion 90 and a second portion 92. In the present embodiment of the invention, first portion 90 is positioned at an approximate ninety degree angle with respect to second portion 92.

First portion 90 includes an aperture 93, an upper surface 94 and a rear surface 95. Second portion 92 extends downward from first portion 90 and includes a jogged portion 96 intermediate a straight portion 97 and a straight portion 98.

Figure 9:
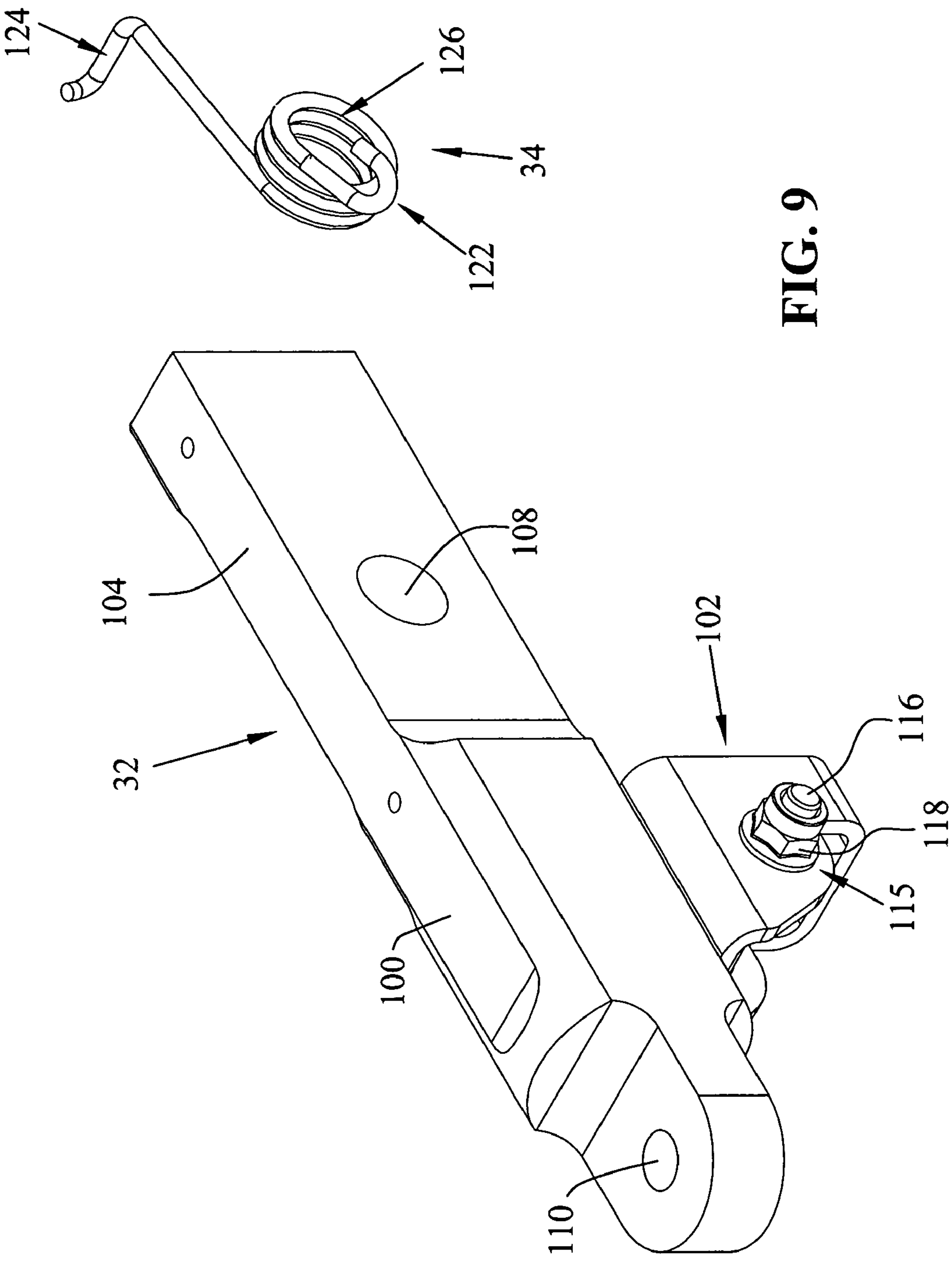
FIG. 9 depicts a perspective view of an embodiment of an arm and a spring utilized in the switch assembly depicted in FIG. 3.
Figure 10:
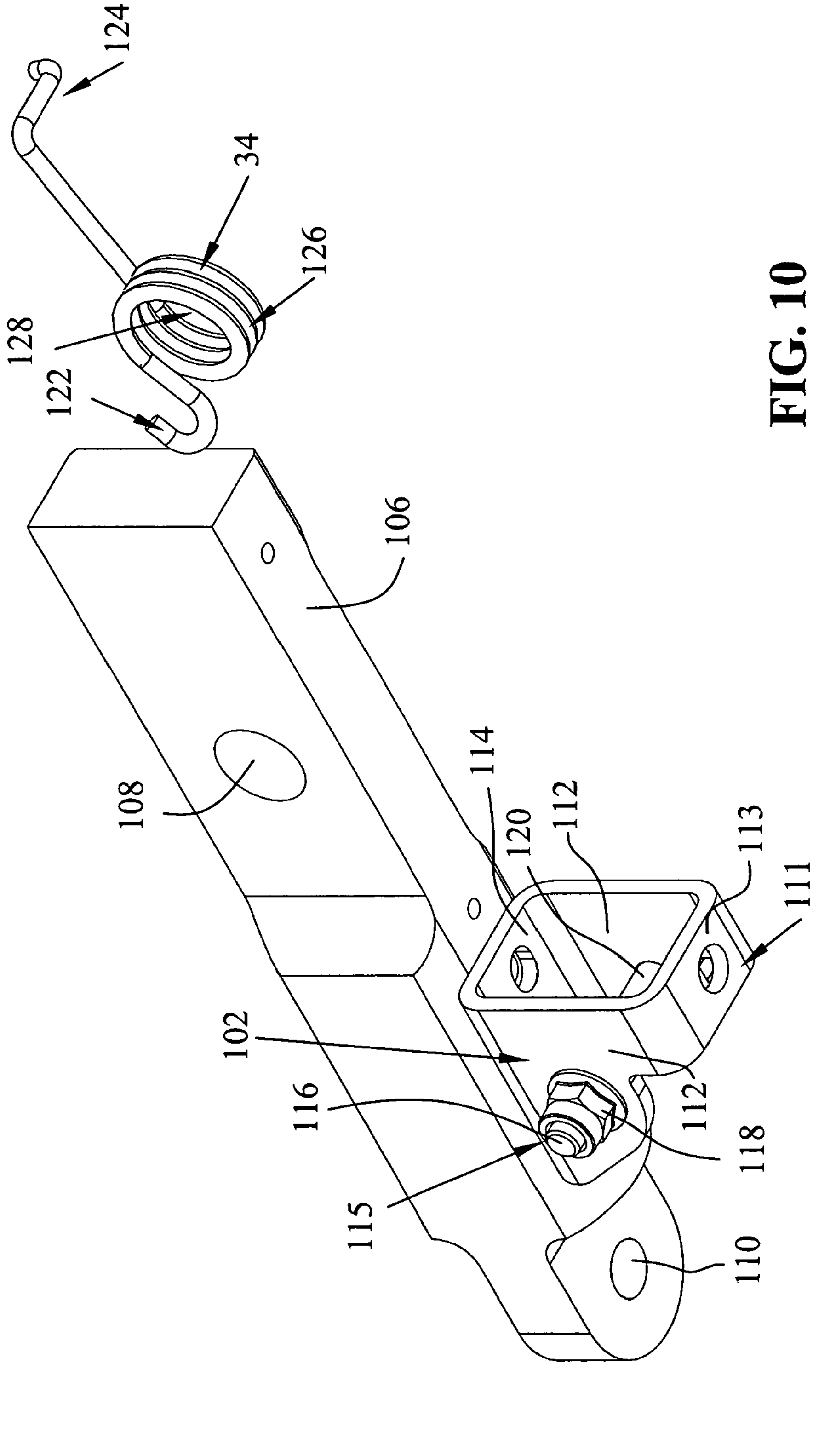
FIG. 10 depicts an underside perspective view of the embodiment of the arm and the spring depicted in FIG. 9.

With reference now to FIGS. 9 and 10, arm 32 includes a body portion 100 and a bracket assembly generally indicated by numeral 102. Body portion 100 may be manufactured from any suitable material, such as a metal. Body 100 includes an upper surface 104, a lower surface 106, an aperture 108 and an aperture 110.

Bracket assembly 102 includes a bracket 111 and a bolt assembly 115. Bracket 111 may be manufactured from any suitable material such as a metal. Bracket 111 includes a pair of walls, each indicated by numeral 112, a lower portion 113 and an upper portion 114. In the present embodiment of the invention, walls 112 interconnect lower portion 113 and upper portion 114, and each wall 112 includes an aperture (not shown).

Bolt assembly 115 includes a bolt 116, a mating nut 118 and a sleeve 120. In the present embodiment, bolt 116 extends through sleeve 120 and the apertures present within walls 112. Nut 118 mates with bolt 116 and retains bolt 116 in a fixed position within the bracket 111.

Referring still to FIGS. 9 and 10, spring 34 includes a handle engaging portion 122, an arm engaging portion 124 and a stressed portion 126. Handle engaging portion 122 is curved and sized to receive a portion of locking handle 30. Similarly, arm engaging portion 124 is sized to receive a portion of arm 32. Stressed portion 126 is located intermediate portion 122 and portion 124 and provides a force so as to bias portion 122 toward portion 124 in a known manner. Stressed portion 126 defines a receiving area, generally indicated by numeral 128. Spring 34 may be manufactured from any suitable material.

Figure 11:
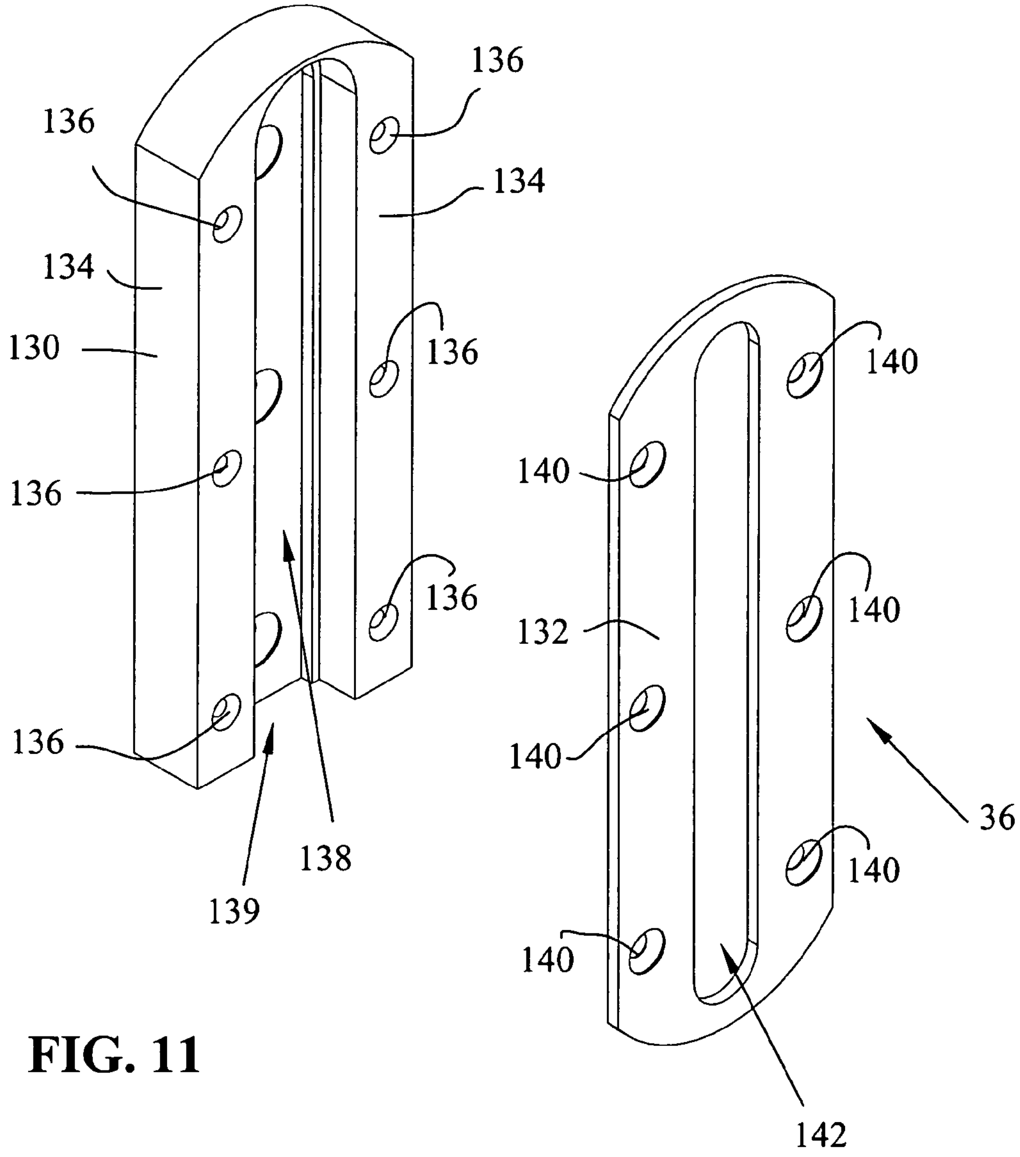
FIG. 11 depicts an exploded perspective view of an embodiment of a base utilized in the switch assembly depicted in FIG. 3.

FIG. 11 depicts an exploded respective view of base 36. Base 36 includes a channel portion 130 and a cover 132. The channel portion 130 and the cover 132 may each be manufactured from any suitable material, such as metal.

Channel portion 130 includes a pair of bodies, each generally indicated by numeral 134. The bodies 134 include a plurality of apertures, each indicated by numeral 136. In addition, bodies 134 define a channel, generally indicated by numeral 138.

Cover 132 has a shape complementary to channel portion 130. Cover 132 includes a plurality of apertures 140. Apertures 140 are appropriately located so as to align with apertures 136 when cover 132 is placed upon channel portion 130. Cover 132 further includes a channel, generally indicated by numeral 142.

Figure 12:
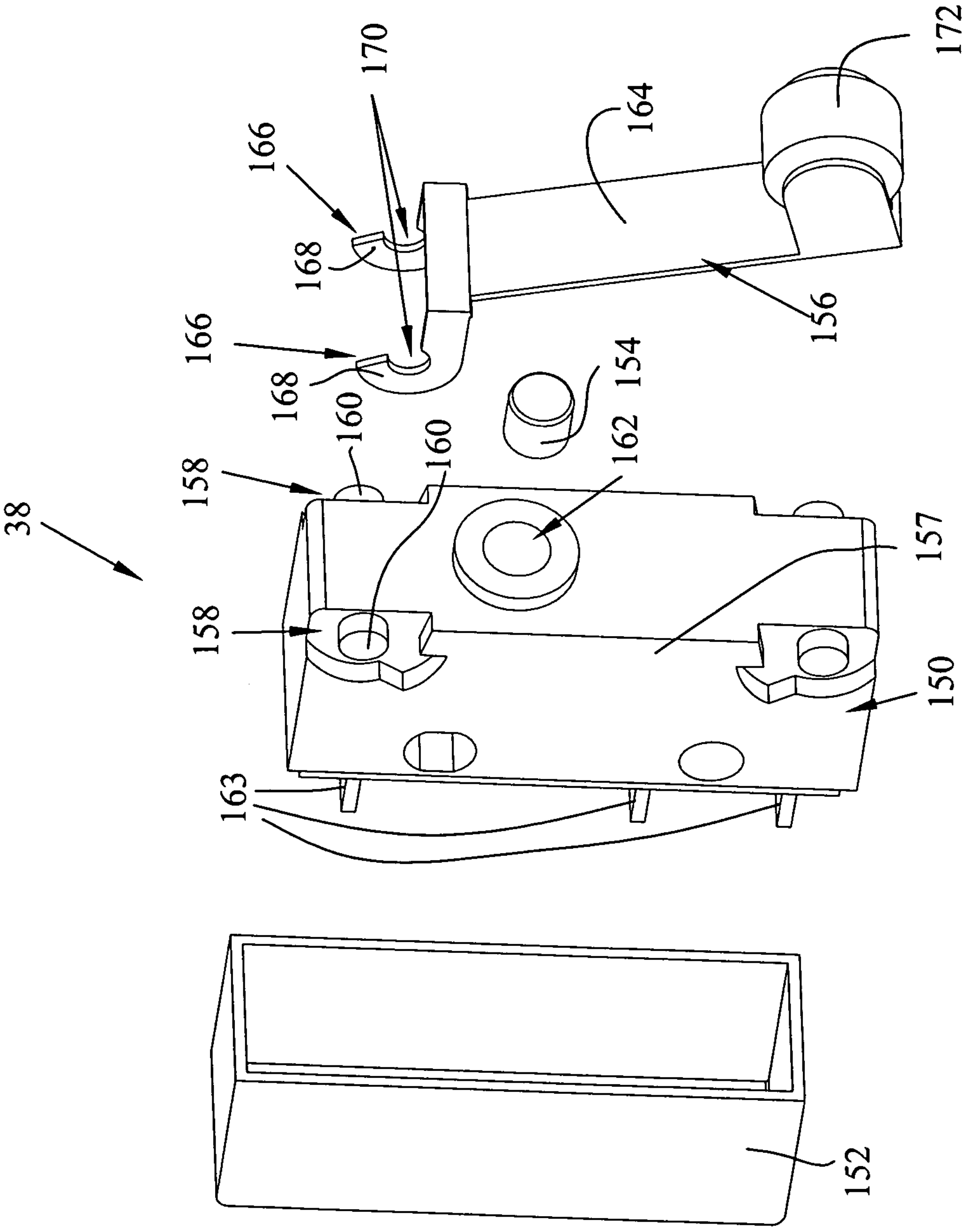
FIG. 12 depicts an exploded perspective view of an embodiment of a switch utilized in the switch assembly depicted in FIG. 3.
Figure 13:
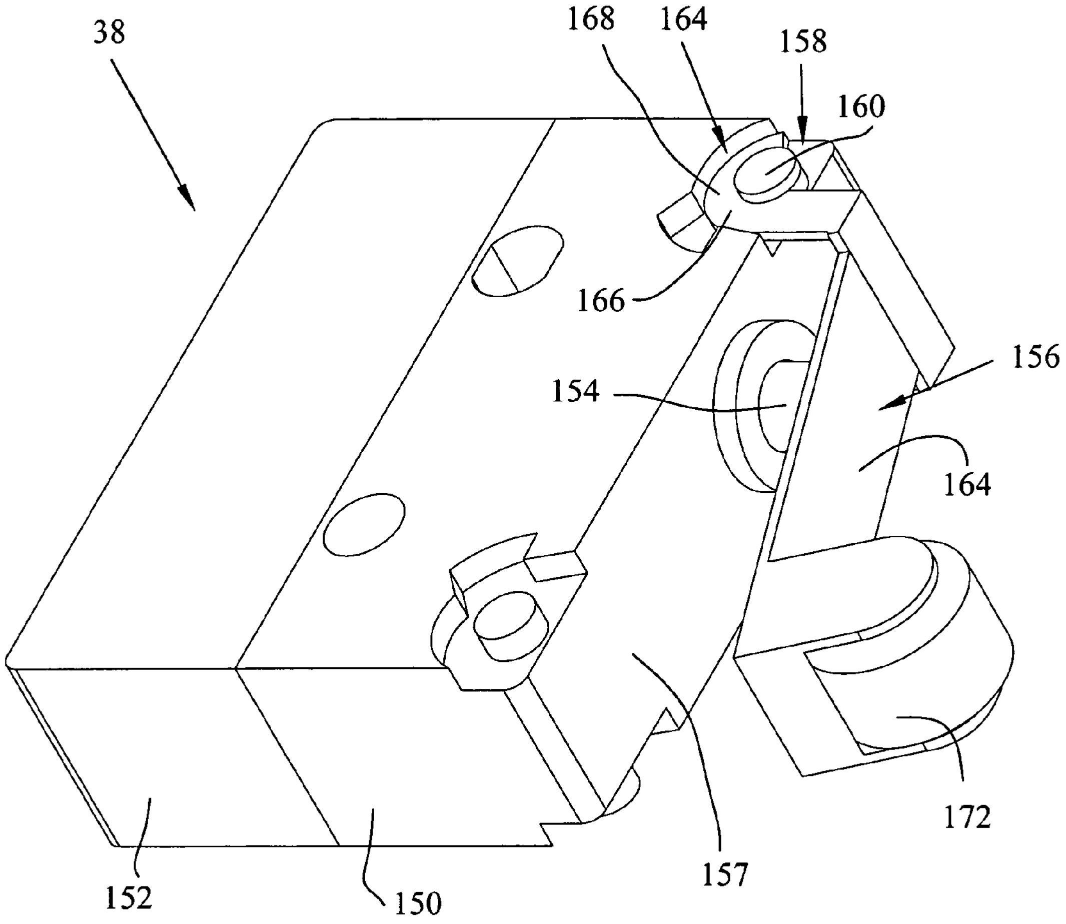
FIG. 13 depicts an underside perspective view of the embodiment of the switch depicted in FIG. 12.

FIGS. 12 and 13 depict an embodiment of switch 38 utilized in embodiments of the present invention. The present embodiment of switch 38 includes an electrical component 150, a cover 152, a plunger 154 and an assembly 156.

Electrical component 150 includes housing 157 containing electrical connections (not shown), as would be known in the art. Housing 157 includes a plurality of recessed areas 158 each including a raised cylinder 160. In the present embodiment of the invention, recessed area 158 has a substantially arcuate shape.

Housing 157 further includes an aperture 162 allowing access to the electrical components within housing 157, as would be understood by one with skill in the art. Electrical connectors 163 allow for the connection of the switching electrical components within housing 157 to a processor (not shown) in a known manner. A plurality of electrical connectors 163 extend outward from the back of housing 157 opposite aperture 162.

Cover 152 may be manufactured of any suitable material and has a shape complementary to that of housing 157. Cover 152 may include an aperture (not shown) allowing external electrical wires (not shown) to access electrical connectors 163. It should be noted that in embodiments of the invention, an epoxy or similar type material applied to housing 157 following connection of electrical wires to electrical connectors 163 may be substituted for housing 157.

Plunger 154 may be manufactured from any suitable material. Plunger 154 has a cylindrical shape and is sized and configured to be received by aperture 162. Plunger 154 is capable of engaging the electrical components housed within housing 157, so that the electrical components send a first signal when plunger 154 is depressed and a second signal when plunger 154 is released, in a known manner.

Assembly 156 includes a body 164 manufactured from any suitable material, such as aluminum. One end of body 164 includes a pair of connecting portions, each generally indicated by numeral 166. Connecting portions 166 include arcuate members 168 defining a receiving area 170. Receiving area 170 is sized and configured to receive a raised cylinder 160.

Body 164 also includes a member 172 attached to the end of body 164 opposite the connecting portions 166. In the depicted embodiment of the invention, member 172 is a roller. In alternative embodiments of the invention, member 172 may be any similar component known in the art, such as a knob manufactured from high density polyethylene. Member 172 may be connected to body 164 in a known manner allowing for the rotation of member 172.

In the final assembly of switch 38, plunger 154 is positioned within aperture 162 thereby allowing plunger 154 to be electronically connected to the electrical components residing within housing 157 in a known manner. Assembly 156 is then moved into a position so that the raised cylinders 160 reside within receiving areas 170. As would be understood by one with skill in the art, the arcuate shape of recess 158 and the complementary shape of arcuate member 168 allows the assembly 156 to pivot about raised cylinders 160.

Figure 14:
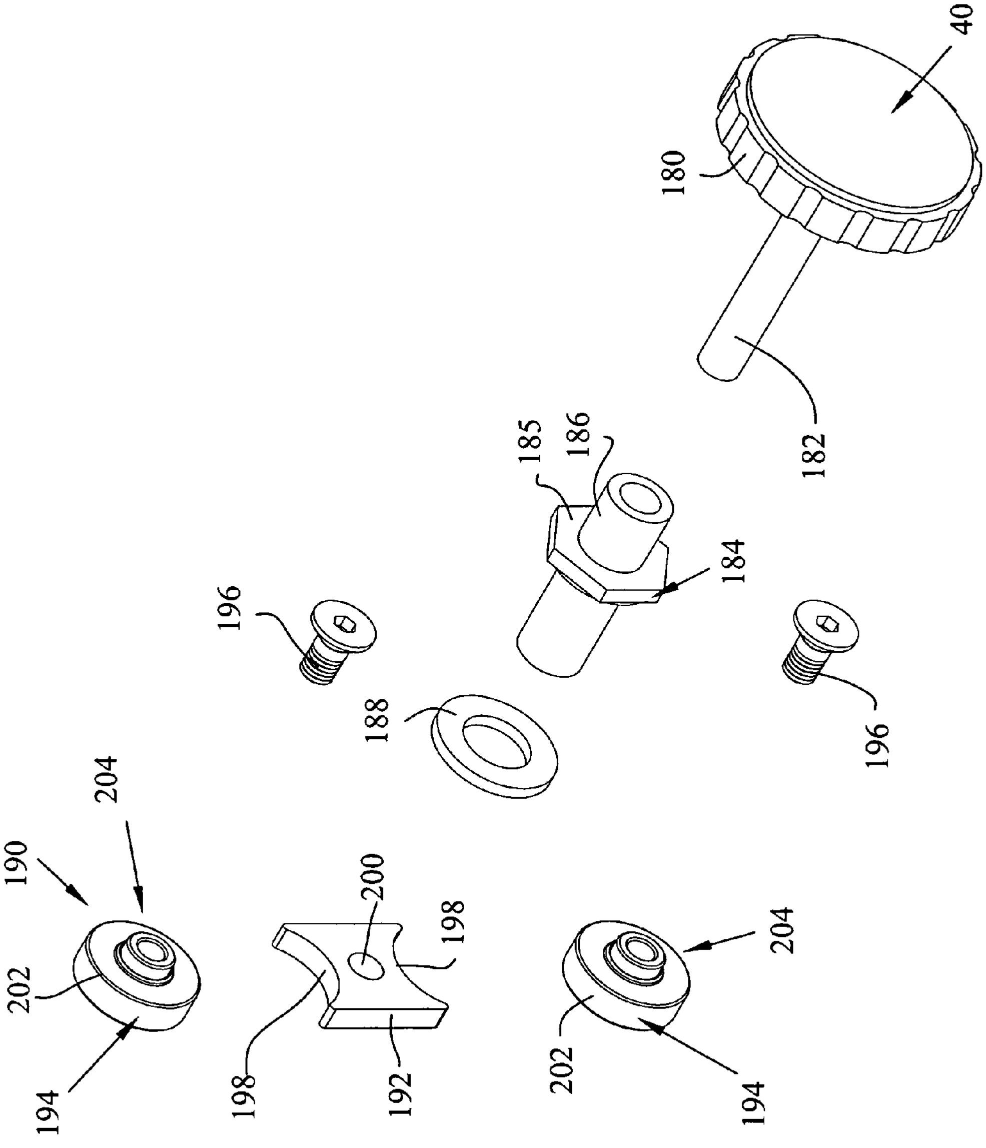
FIG. 14 depicts an exploded perspective view of an embodiment of a locking mechanism utilized in the switch assembly depicted in FIG. 3.

FIG. 14 depicts locking mechanism 40. Locking mechanism 40 includes a handle 180, a threaded rod 182, a threaded bolt 184, a sleeve 186, a washer 188 and a roller assembly 190. Handle 180 may be any type known in the art including a receiving area on the underside (not shown). Handle 180 may be manufactured of any suitable material such as injection molded plastic.

Threaded rod 182 has an elongated shape and includes a plurality of threads (not shown) running the length thereof. Threaded rod 182 is configured to be partially received within handle 180 in a manner ensuring that rod 182 rotates with handle 180 as handle 180 rotates.

Bolt 184 may include a plurality of threads (not shown) traversing its outer surface, in an embodiment of the invention. In the depicted embodiment of the invention, the outer surface of bolt 184 has a substantially smooth surface. The outer bolt 184 should be formed complementary to aperture 108 of arm 32 so as to allow aperture 108 to receive bolt 184. Bolt 184 also includes a smooth aperture (not shown) sized to allow threaded rod 182 to pass freely. In addition, bolt 184 includes a head portion 185.

Sleeve 186 has a substantially cylindrical shape. In the present embodiment of the invention, sleeve 186 may be manufactured from any suitable material, such as plastic.

Washer 188 may be any type known in the art. Washer 188 may be any known type of washer and manufactured from any suitable material, such as plastic.

In the present embodiment of the invention, roller assembly 190 includes block 192, a pair of rollers 194 and a pair of fasteners 196. In the present embodiment, block 192 may be manufactured from any suitable material such as aluminum. Block 192 includes arcuate surfaces 198 and an aperture 200. Aperture 200 includes threads (not shown) complementary to the threads of threaded rod 182.

Rollers 194 include an arcuate surface 202 and a threaded receiving portion 204. The arcuate surface 202 of rollers 194 may be manufactured from any suitable material, such as aluminum. Receiving portion 204 includes internal threads. Rollers 194 are configured to ensure that when receiving portion 204 remains fixed, arcuate surface 202 is still capable of rotation.

Fasteners 196 may be any type known in the art. The fasteners 196 include threads capable of mating with the threads of the receiving portion 204.

With reference to FIGS. 3-14, the assembly of automatic switch assembly 20 will now be described. The following description is being given for exemplary purposes only and is not intended to limit the invention in any manner. As would be understood by one with ordinary skill in the art, the order of the following steps may be altered as desired and merely provide an example of assembling an embodiment of the invention.

Cover 132 is placed upon base 130 so that apertures 140 align with apertures 136. Fasteners (not shown) may then be threaded into the apertures 136, 140, in a known manner, in order to ensure the cover 132 remains attached to base 130.

Roller assembly 190, less fasteners 196, may be inserted into the open end 139 of channel 138. With roller assembly 190 residing within channel 138, switch control assembly 28 may be positioned so that aperture 82 of plate 70 aligns with aperture 200 of block 192. When switch control assembly 28 is properly positioned, the receiving portion 204 of the rollers 194 align with apertures 88 of plate 70. Fasteners 196 may then be inserted through apertures 88 and threaded into portions 204 in order to affix rollers 194 to plate 70. In addition, the extension of fasteners 196 through apertures 88 succeeds in retaining rollers 194 and block 192 within channel 138, since the contact between fasteners 196 and cover 132 prevent the exiting of the rollers 194 through opening 139.

Locking handle 30 may be affixed to arm 32. To achieve this connection, arm engaging portion 124 of spring 34 is moved into engagement with bracket 102 of arm 32. Bolt 116 of bolt assembly 115 is then inserted into bracket 102 in a manner ensuring bolt 116 extends through sleeve 120, the receiving area 128 of spring 34 and the aperture 93 of locking handle 30. Nut 118 may then be utilized to retain bolt 116 within bracket 102. It should be noted that handle engaging portion 122 of spring 34 should be moved into a position to engage horizontal portion 94 of locking handle 30. The interaction between spring 34 and locking handle 30 biases locking handle 30 in a direction of arm 32.

Switches 38 may be attached to arm 32 by way of any manner known. For example, an angle iron (not shown) may encompass the switches 38 and be bolted to arm 32. In other embodiments of the invention, the switches 38 may be welded to arm 32.

Washer 188 may then be placed onto plate 70. When properly positioned, washer 188 aligns with aperture 82. Arm 32 may then be placed onto washer 188 so that aperture 108 aligns with aperture 82. In placing arm 32 onto the washer 188, locking handle 30 must be moved away from arm 32 in order to ensure one of the bolt assemblies 72 resides intermediate handle 30 and arm 32. Threaded bolt 184 may then be inserted into aperture 108 of arm 32. A locking substance known in the art may be utilized to retain the threaded bolt 184 within aperture 108.

Threaded rod 182 is attached to handle 180 in a manner ensuring the rotation of handle 180 results in the rotation of threaded rod 182. Sleeve 186 may then be placed onto threaded rod 182, and cover 22 may be positioned such that a portion of sleeve 186 extends through aperture 54. Threaded rod 182 may then be inserted into threaded bolt 184, aperture 108 of plate 70, washer 188 and threaded into aperture 200 of block 192. It should be noted that continued rotation of handle 180 ultimately draws plate 70 into contact with cover 132, thereby preventing movement of plate 72 with respect to base 36. When handle 180 is rotated in the opposite direction, pressure is released from plate 72 thereby decreasing the frictional force between plate 72 and cover 132. The decrease in frictional force between plate 72 and cover 132 allows the plate 192 and the rollers 194 to traverse channel 138, thereby resulting in the movement of arm 32 with respect to base 36.

The rear covers 24, 26 each may be attached to cover 22 in a known manner. For example, fasteners (not shown) may be utilized to attach the rear covers 24, 26 to cover 22. In alternative embodiments, adhesives may be utilized to join the covers 22, 24, 26 together. Automatic switch assembly 20 may now be attached to the remaining components of the arm rest in a known manner.

Figure 15:
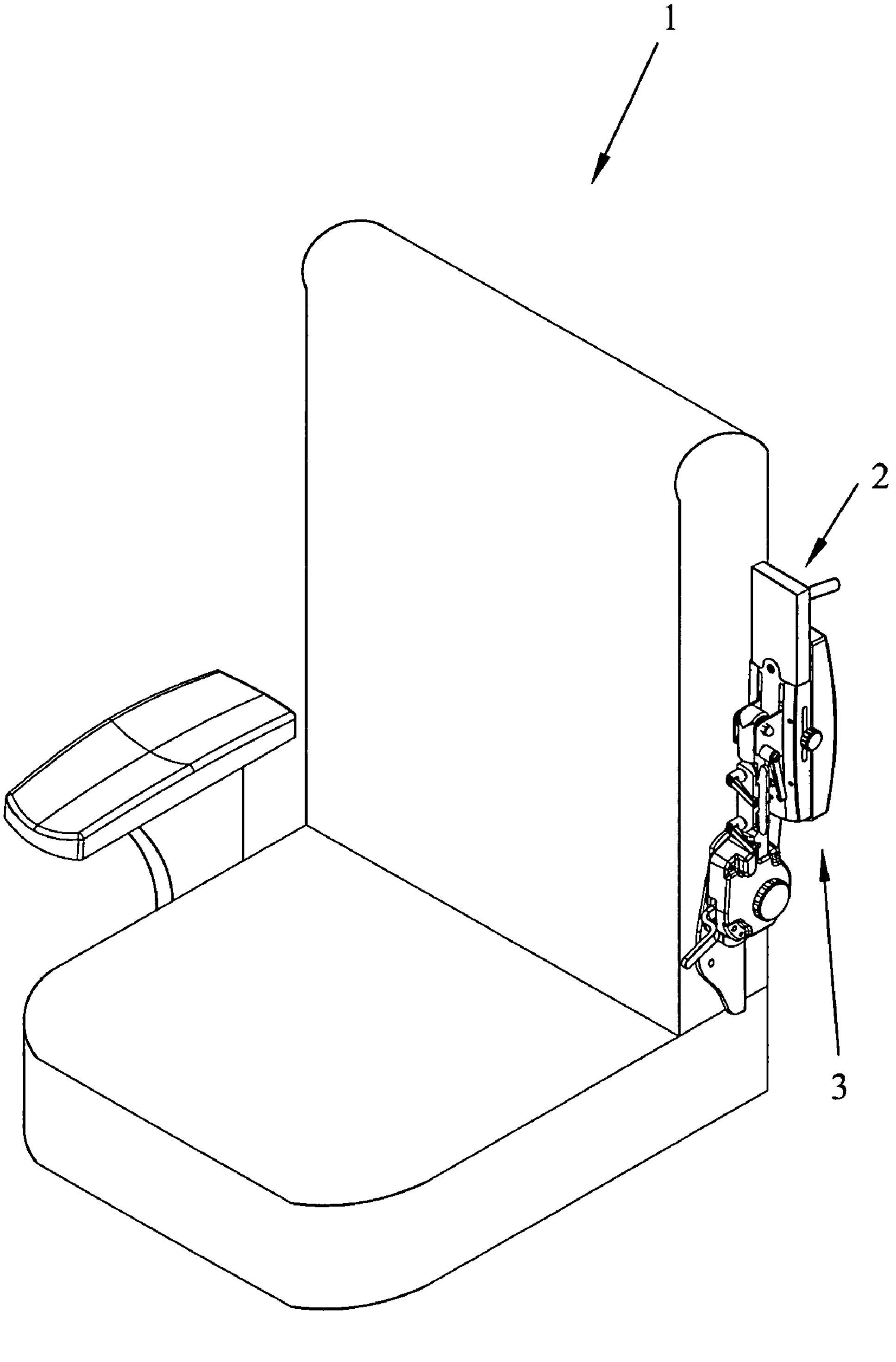
FIG. 15 depicts a perspective view of the operator's position depicted in FIG. 1 with the arm rest and joystick rotated in the substantially vertical plane.
Figure 16:
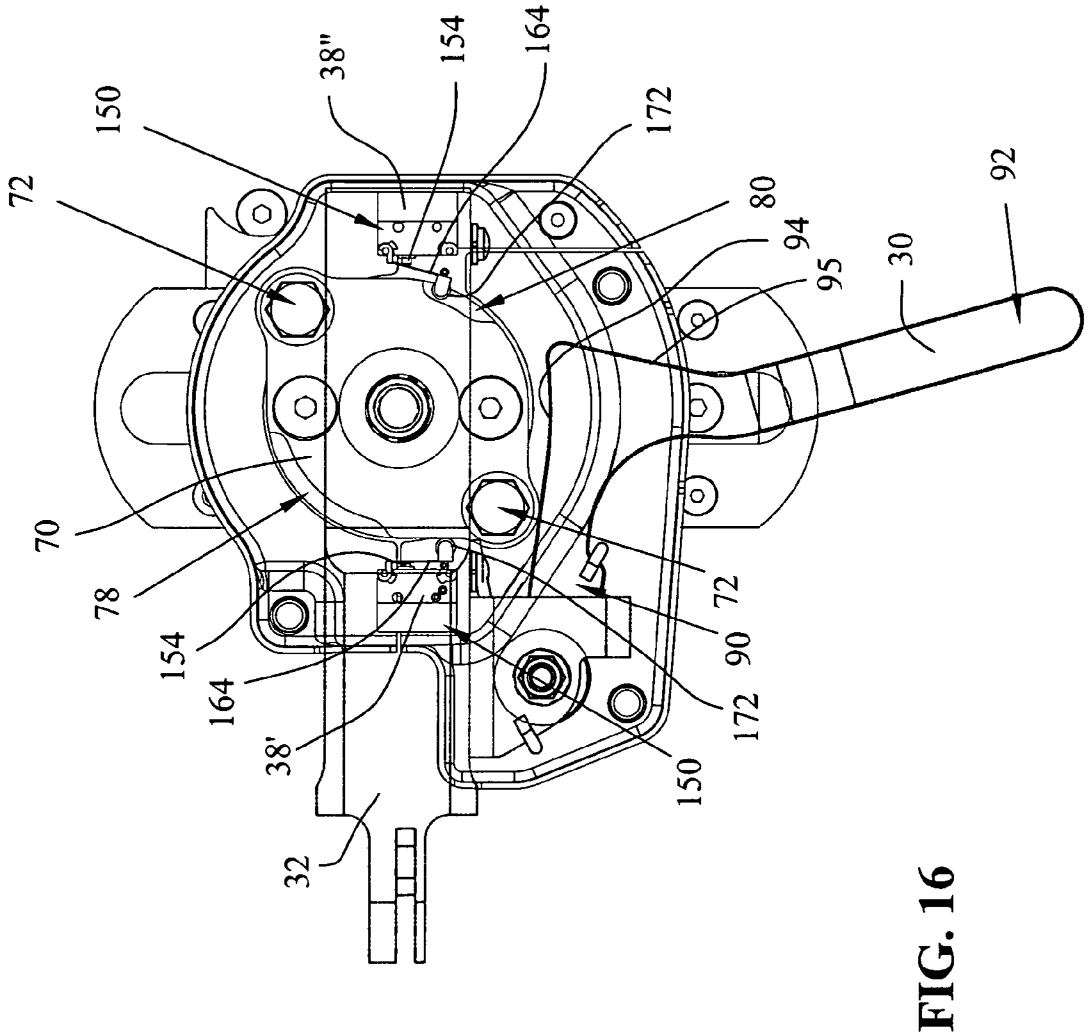
FIGS. 16-18 depict a top view of the embodiment of the switch assembly depicted in FIG. 3 with certain components removed in order to illustrate movement of the arm from the first position to the second position.
Figure 17:
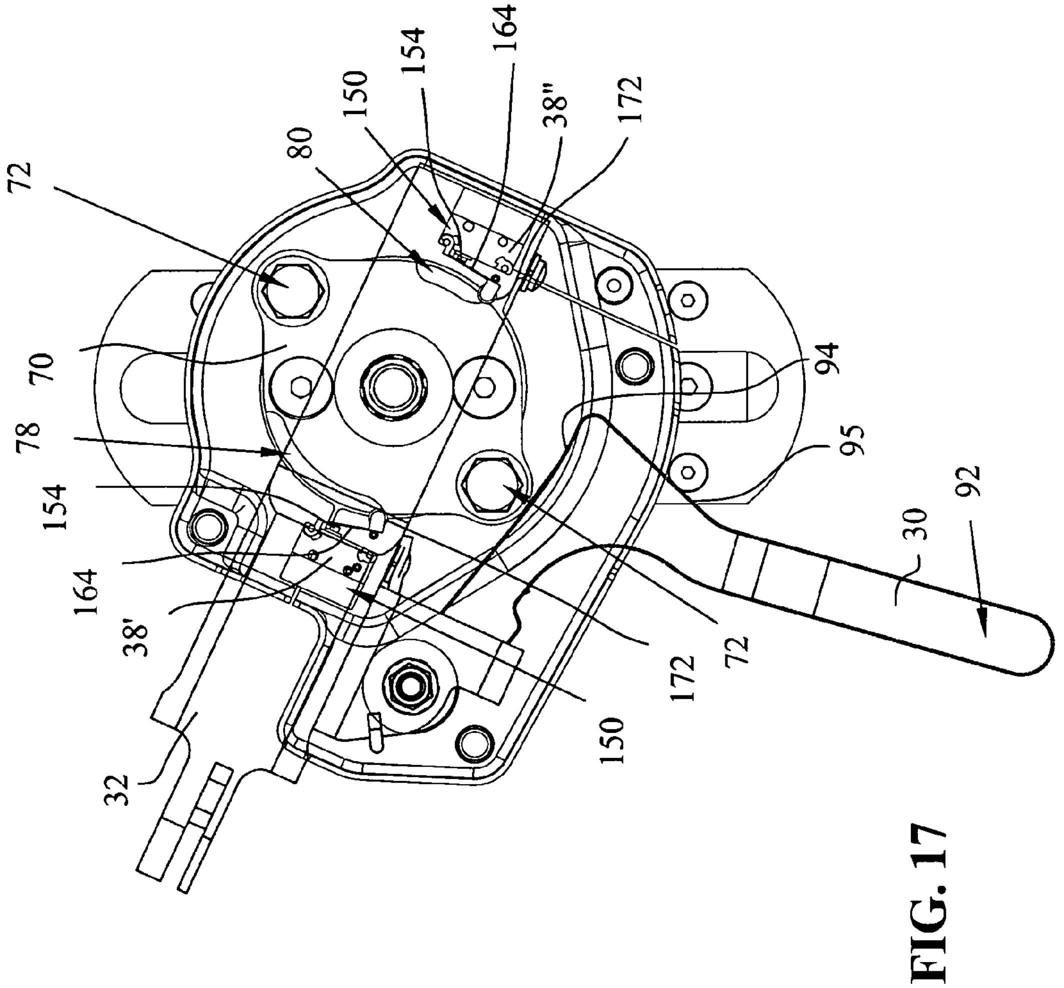
Figure 18:
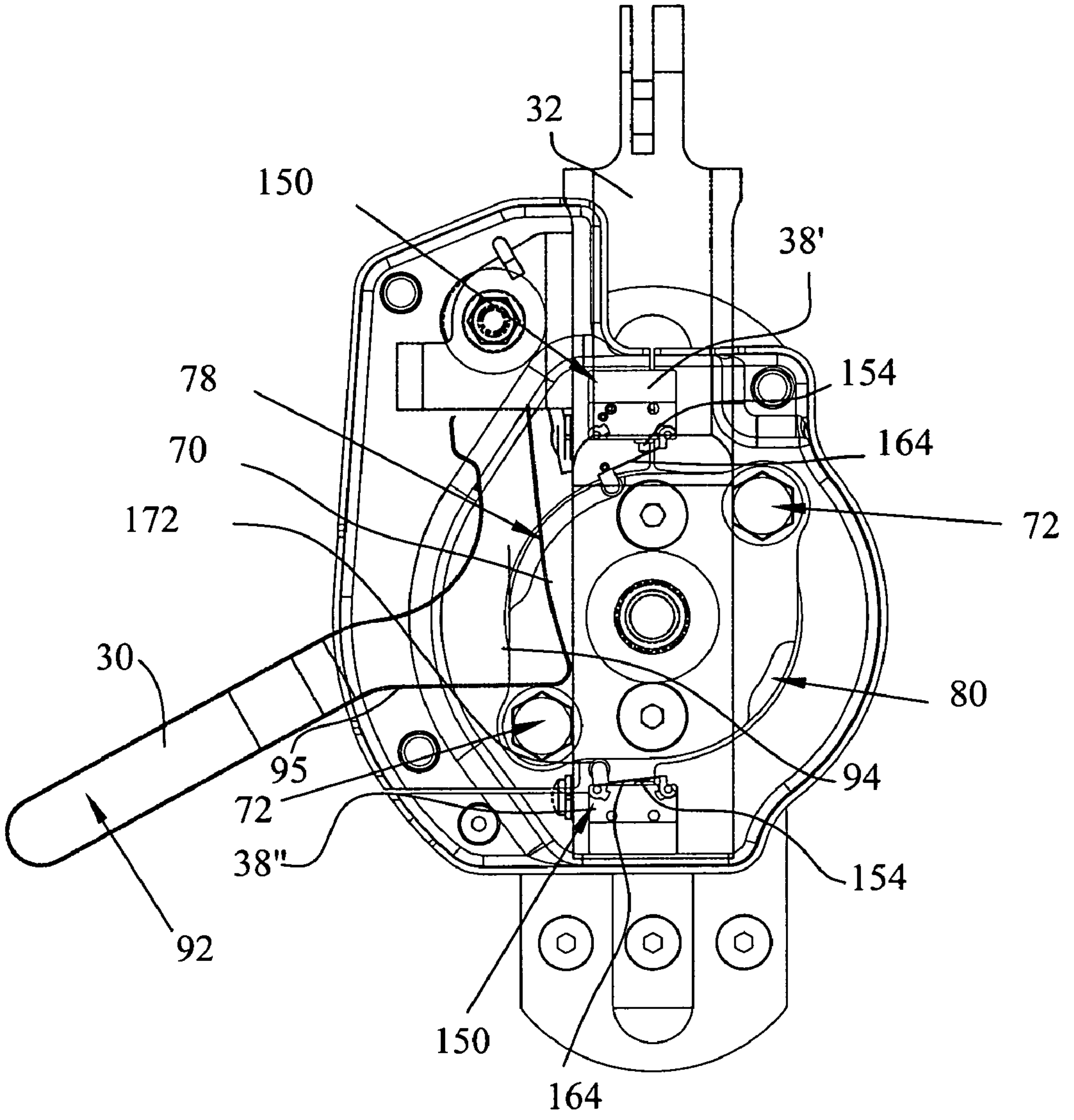

In operation, arm 32 is capable of approximately ninety degrees of rotation about threaded rod 108 from the position depicted in FIG. 1 to the position depicted in FIG. 15. With reference to FIGS. 16-18, the automatic switch assembly 20 is depicted moving from the substantially horizontal position of FIG. 1 to the substantially vertical position depicted in FIG. 15. In FIGS. 16-18, certain components have been omitted and others have been drawn transparent in order to simplify the present description.

In the present embodiment, contact between one of the bolt assemblies 72 attached to plate 70 and the under surface 106 of arm 32 prevents rotation of arm 32 below the horizontal. When arm 32 is positioned horizontally, the bolt assembly limiting movement of the arm 32 is positioned intermediate arm 32 and locking handle 30. Arm 32 may be rotated about threaded rod 108 into a substantially vertical position until the upper surface 104 of arm 32 contacts the other of bolt assemblies 72. The contact between bolt assembly 72 and the upper surface 104 presents rotation of arm 32 beyond a substantially vertical axis. It should be noted that when arm 32 is positioned in the substantially vertical position, locking handle 30 moves into contact with under surface 106 of arm 32 due to the force provided by spring 34.

The movement of locking handle 30 against under surface 106 of arm 32 causes the rear surface 95 of locking handle 30 to contact the lower of the bolt assemblies 72. The contact between rear surface 95 and bolt assembly 72 prevents the inadvertent rotation of arm 32 into the horizontal position. Accordingly, in order to rotate arm 32 from the vertical position to the horizontal position, one must move locking handle 30 away from the lower surface 106 of arm 32, thereby allowing lower bolt assembly 72 to be positioned intermediate arm 32 and locking handle 30 as arm 32 rotates into the horizontal position.

Referring still to FIGS. 16-18, in FIG. 16, arm 32 resides in a substantially horizontal orientation. When arm 32 resides in the depicted position, one of the switches 38' is in the activated position with member 172 riding along the outer edge of plate 70. The positioning of member 172 on the outer edge of plate 70 results in body 164 depressing plunger 154, which in turn, places the electrical components connected thereto to be in a first state. Conversely, the member 172 of the other switch 38" resides within trace 80 thus allowing body 164 to pivot such that plunger 154 is not depressed. When plunger is not depressed, the electrical component connected thereto is in a state differing from the state of the components when the plunger is depressed.

FIG. 17 depicts arm 32 positioned intermediate the substantially horizontal position depicted in FIG. 16 and the substantially vertical position depicted in FIG. 18. In FIG. 17, switch 38' is entering trace 78. Once switch 38' has fully entered trace 78, the switch will change states from an activated state to a deactivated state as plunger 154 is no longer depressed by body 164. At substantially the same time, switch 38" is exits trace 80 and also changes states. Switch 38" exits trace 80 and member 172 begins riding along the outer surface of plate 70. The interaction between member 172 and the outer edge of plate 70 causes body 164 to depress plunger 154. In addition, traces 78, 80 are located such that the two switches 38 both change states at substantially the same time.

FIG. 18 depicts arm 32 as being in the substantially vertical position. When arm 32 resides in this position, switch 38' resides within trace 78 in the deactivated state, and switch 38" resides on the outer surface of plate 70 in the activated state. It should be noted that when arm 32 is positioned with a substantially vertical orientation, the switches 38 are in opposite states than the states of the switches 38 when arm 32 is positioned with a substantially horizontal orientation. Accordingly, whenever the arm 32 is moved by an operator from the horizontal orientation to the vertical orientation, the switches 38 both change states at substantially the same time. Similarly, whenever the arm 32 is moved from the substantially vertical state into the substantially horizontal state, the switches 38 both change state at substantially the same time.

With the above understanding, logic circuits may be programmed within the processor to monitor the switching of the switches 38. The logic circuits may be programmed to interpret a simultaneous change in the state of both switches 38 as an indication that arm 32 has moved from a first position to a second position. For example, a simultaneous change in the state of the switches 38 may indicate movement of arm 32 form the horizontal orientation to the vertical orientation. Accordingly, when logic circuits detect this change, the logic circuits may then deactivate the joystick 2 for safety purposes. As a safety feature, the logic circuits may then only reactivate joystick 2 when detecting a change in the state of both switches 38, as the arm 32 moves from the vertical position into the horizontal position. This arrangement succeeds in preventing accidental reactivation of joystick 2 upon the failure of a single switch 38, since both switches 38 must change state nearly simultaneously.

While this invention has been described as having an exemplary design, the present invention may be further modified within the spirit and scope of this disclosure. The application is intended, therefore, to cover any variations, uses, or adaptations of the invention using its general principles. Further, this application is intended to cover such departures from the present disclosure as come within known or customary practice in the art to which this invention pertains.

What is claimed is:

1. An operator interface for control of a motorized vehicle comprising:

a. at least one joystick positioned proximate an armrest when located in an operative position, the joystick generating electric signals sent to a processor responsive to joystick movement; and b. a plurality of switches electrically connected to the processor;

c. wherein movement of the armrest into a non-operating position causes the switches to change states at substantially the same time and to send signals to the processor in order to prevent the processor from processing signals received from the joystick.

2. The operator interface as set forth in claim 1 wherein the joystick is connected to the armrest.

3. The operator interface as set forth in claim 1 wherein the armrest rotates in a near vertical plane.

4. The operator interface as set forth in claim 3 wherein a distal portion of the armrest rotates in a near horizontal plane.

5. The operator interface as set forth in claim 1 wherein the plurality of switches are wired in series.

6. The operator interface as set forth in claim 1 wherein two switches are connected to the processor.

7. The operator interface as set forth in claim 1 wherein the armrest comprises an arm and a switch control assembly, wherein the switches are mounted to the arm and engage the switch control assembly.

8. The operator interface as set forth in claim 7 wherein the armrest includes a locking handle capable of preventing rotation of the armrest.

9. The operator interface as set forth in claim 7 wherein the switch control assembly comprises a plate including at least one trace and a pair of stops mounted to the plate, the switches riding on the outer surface of the plate and entering and exiting the traces as the armrest moves from the horizontal position to the vertical position.

10. The operator interface as set forth in claim 9 wherein one of the switches enters one of the traces as another of the switches exits one of the traces.

11. The operator interface as set forth in claim 10 wherein the switches include electrical components connected to a plunger and a body connected to a roller engaging the plate, the body being capable of actuating the plunger as the roller traverses the outer surface of the plate.

12. An automatic switch assembly comprising:

an arm capable of moving from first position to a second position;

a plate mounted to the arm; and a pair of switches engaging the plate;

wherein the switches change state as the arm moves from a first position to a second position.

13. The automatic switch assembly as set forth in claim 12 further comprising a pair of stops mounted to the plate, the stops preventing movement of the arm to positions beyond the first position and the second position.

14. The automatic switch assembly as set forth in claim 13 further including a locking handle connected to the arm and preventing inadvertent movement of the arm from the first position to the second position.

15. The automatic switch assembly as set forth in claim 14 further including a spring biasing the locking handle in order to ensure the locking handle prevents inadvertent rotation of the arm.

16. The automatic switch assembly as set forth in claim 12 wherein the switches are affixed to the arm.

17. The automatic switch assembly as set forth in claim 16 wherein the switches include a member traversing the outer edge of the plate.

18. The automatic switch assembly as set forth in claim 17 wherein the plate includes at least one trace configured such that the locating of the members in the trace results in the switch being in an opposite state than the state of the switches when the member is engaging the outer edge of the plate.

19. The automatic switch assembly as set forth in claim 18 wherein the plate includes two traces positioned so that the two switches change state at substantially the identical time.

20. The automatic switch assembly as set forth in claim 19 wherein the two traces are positioned so that the two switches are always in opposite states.

21. The automatic switch assembly as set forth in claim 17 wherein the members are rollers.

22. The automatic switch assembly as set forth in claim 12 wherein the switches change state at substantially the same time.

23. An apparatus comprising:

an arm moveable between a first position and a second position;

a plate connected to the arm having an outside edge including a plurality of recesses;

a plurality of switches connected to the arm, the switches including a member traversing the outer edge of the plate, the switches being in a first state when the member is positioned in a recess and in a second state when the member is not in a recess.

24. The apparatus as set forth in claim 23 further comprising a handle connected to the arm, the handle allowing the arm to move freely from the first position to the second position and allowing movement of the arm from the second position to the first position only when the handle is actuated.

25. The apparatus as set forth in claim 24 wherein the plate includes a pair of stops, the first stop abutting the arm when the arm is moved into the first position and the second stop abutting the arm when the arm is moved into the second position.

26. The apparatus as set forth in claim 25 wherein the handle abuts against the first stop when the arm is located in the second position in order to prevent movement of the arm into the first position.

27. The apparatus as set forth in claim 23 wherein the switches include a housing containing electrical components, a plunger electrically connected to the electrical components, a member pivotally connected to the housing and capable of actuating the plunger, a roller connected to the body opposite the pivotal connection.

28. The apparatus as set forth in claim 23 including two switches and the plate includes two recesses.

29. The apparatus as set forth in claim 23 further including a rod defining an axis and connecting the arm to the plate, the arm capable of rotation about the axis.

30. The apparatus as set forth in claim 29 wherein the plate has a substantially circular shape, the rod extending through an aperture positioned substantially in the center of the plate.

31. The apparatus as set forth in claim 23 wherein the switches change states as the arm moves from one position to the other position.

32. The apparatus as set forth in claim 31 wherein the switches change states at substantially the same time as the arm moves from one position to the other position.

* * * * *